(12) United States Patent
Mock et al.

(10) Patent No.: US 8,075,195 B2
(45) Date of Patent: Dec. 13, 2011

(54) MULTI-ROW SYMMETRICAL ROLLING BEARING

(75) Inventors: Christian Mock, Schweinfurt (DE);
Peter Niebling, Bad Kissingen (DE);
Ralf Heiss, Schweinfurt (DE)

(73) Assignee: Schaeffler KG, Herzogenaurach (DE)

( * ) Notice: Subject to any disclaimer, the term of this patent is extended or adjusted under 35 U.S.C. 154(b) by 629 days.

(21) Appl. No.: 12/162,664

(22) PCT Filed: Jan. 17, 2007

(86) PCT No.: PCT/DE2007/000070
§ 371 (c)(1),
(2), (4) Date: Aug. 27, 2008

(87) PCT Pub. No.: WO2007/087776
PCT Pub. Date: Aug. 9, 2007

(65) Prior Publication Data
US 2009/0116778 A1 May 7, 2009

(30) Foreign Application Priority Data
Jan. 31, 2006 (DE) .......................... 10 2006 004 273

(51) Int. Cl.
*F16C 19/18* (2006.01)

(52) U.S. Cl. .......................... 384/512; 384/504; 384/544

(58) Field of Classification Search .................. 384/458, 384/492, 504, 512, 537, 544–545
See application file for complete search history.

(56) References Cited

U.S. PATENT DOCUMENTS

| 466,446 | A | * | 1/1892 | Simonds | 384/545 |
| 804,954 | A | * | 11/1905 | Johanson | 384/544 |
| 845,778 | A | * | 3/1907 | Hachfield | 384/544 |
| 918,422 | A | * | 4/1909 | Coppins | 384/544 |
| 983,792 | A | | 2/1911 | Whitney | |
| 990,946 | A | | 5/1911 | Badger | |
| 1,325,113 | A | * | 12/1919 | Robn | 384/512 |
| 1,392,912 | A | * | 10/1921 | Chesnutt | 16/46 |
| 5,118,205 | A | * | 6/1992 | Hoffmann | 384/512 |
| 5,490,732 | A | * | 2/1996 | Hofmann et al. | 384/537 |
| 6,824,489 | B2 | * | 11/2004 | Jacob et al. | 384/504 |
| 7,547,147 | B2 | * | 6/2009 | Niebling et al. | 384/512 |
| 2007/0104404 | A1 | * | 5/2007 | Niebling et al. | 384/504 |

FOREIGN PATENT DOCUMENTS

| DE | 92 02 230 | | 4/1992 |
| DE | 100 60 638 A | | 8/2001 |
| DE | 103 31 936 | | 2/2005 |
| DE | 20 2004 020400 A | | 6/2005 |
| GB | 2 371 603 | | 7/2002 |
| JP | 200348458 A | * | 5/2003 |
| WO | 2006/119738 | | 11/2006 |

* cited by examiner

*Primary Examiner* — Marcus Charles
(74) *Attorney, Agent, or Firm* — Lucas & Mercanti, LLP

(57) ABSTRACT

The rolling bearing has a first bearing ring, a second bearing ring and a plurality of rolling bodies which are arranged between the first bearing ring and the second bearing ring. The rolling bodies are arranged in at least four rows. At least two rows have a first reference diameter and at least two further rows have a second reference diameter which is different from the first reference diameter, and those rows which have the same reference diameter are arranged symmetrically with respect to a predefined plane which is aligned perpendicular to a longitudinal direction of the bearing.

13 Claims, 2 Drawing Sheets

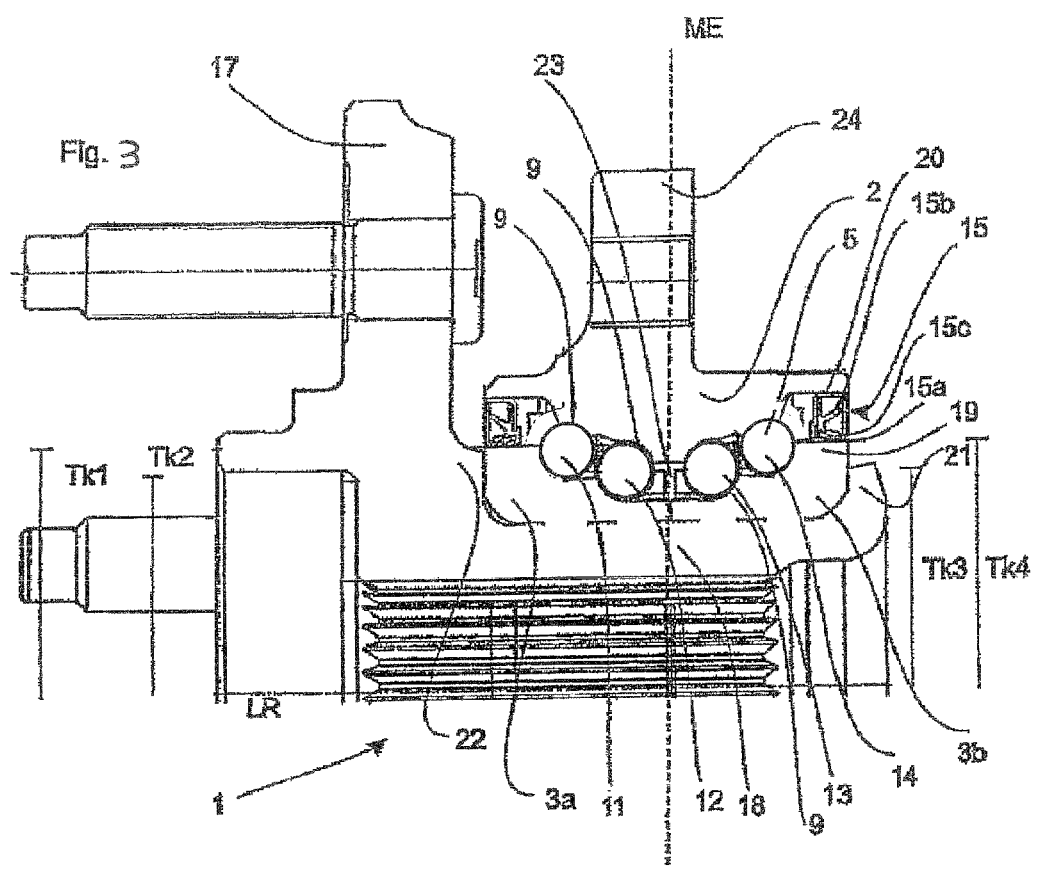

MULTI-ROW SYMMETRICAL ROLLING BEARING

CROSS-REFERENCE TO RELATED APPLICATIONS

This application is a 371 of PCT/DE2007/000070 filed Jan. 17, 2007, which in turn claims the priority of DE 10 2006 004273.5 filed Jan. 31, 2006, the priority of both applications is hereby claimed and both applications are incorporated by reference herein.

BACKGROUND OF THE INVENTION

The present invention is aimed at a symmetrical rolling bearing and in particular at a multi-row symmetrical rolling bearing.

The invention is described with reference to a wheel bearing unit for driven or non-driven wheels of motor vehicles, such as for example of pickup trucks, light trucks or SUVs (sports utility vehicles). It is however pointed out that the present invention may also be used in other rolling bearings.

The prior art discloses rolling bearings which have an outer ring, an inner ring and rolling bodies arranged between the rings. It is also known from the prior art to arrange the rolling bodies in a plurality of rows. For example, DE 100 60 638 A1 discloses a double-row rolling bearing. In this way, it is possible to distribute the loads acting on the bearing between a plurality of rows of rolling bodies, and therefore to a plurality of rolling bodies.

The use of balls in double-row rolling bearings as disclosed by DE 100 60 638 A1 is disadvantageous because this is unsuitable for high axle loads. The use of tapered rollers in double-row wheel bearings has the disadvantage that a high frictional torque is generated in this way.

Rolling bearings having more than two rows are relatively complex to produce and, in addition, it is necessary to determine geometric dimensions which are suitable for production.

The present invention is therefore based on the problem of providing a rolling bearing which is firstly suitable for high axle loads and which can secondly be produced and assembled with a justifiable amount of expenditure. In addition, it is intended to provide a rolling bearing which can be exchanged for a conventional rolling bearing with tapered rollers.

SUMMARY OF THE INVENTION

The rolling bearing according to the invention has a first bearing ring and a second bearing ring. Arranged between the bearing rings is a plurality of rolling bodies. According to the invention, the rolling bodies are arranged in at least four rows, with at least two rows have a first pitch circle diameter and two further rows have a second pitch circle diameter which differs from the first pitch circle diameter. Here, those rows which have, in each case, the same pitch circle diameter are arranged symmetrically with respect to a plane which is to a longitudinal direction of the bearing.

The pitch circle diameter is to be understood to mean the spacing from an axis of symmetry of one rolling body to an axis of symmetry of a rolling body which is situated exactly opposite the rolling body in the same row.

As a result of the provision of at least four rows, the load acting on the bearing can be distributed between a plurality of rows and therefore between a plurality of rolling bodies. The bearing is therefore suitable overall for absorbing higher loads.

As a result of the provision of different pitch circle diameters, the bearing can be adjusted in a particularly suitable way for absorbing forces acting in different directions. Those rows with the greater pitch circle diameter are suitable for absorbing greater forces. In addition, by using different pitch circle diameters, it is possible to obtain the advantage of conical rolling bodies, that is to say a higher load capacity, without it being necessary for this purpose to accept the disadvantages of conical rolling bodies, that is to say higher friction, a higher weight and a movement of the bearing rings relative to one another.

The rows are arranged symmetrically with respect to a plane which is to a longitudinal direction of the bearing, which plane is preferably a central plane. The rolling bearing according to the invention is therefore a symmetrical rolling bearing.

The rolling bearing preferably has an overall width of more than 35 mm. In extensive tests, it was found that rolling bearings with an overall width of more than 35 mm are particularly suitable for absorbing the forces acting on the bearing.

The pitch circle diameters of the outer rows are preferably greater than the pitch circle diameters of the inner rows. With this embodiment, it is possible to obtain the function of tapered rolling bodies whose diameter decreases from the outside to the inside.

In one preferred embodiment, the rolling body diameters of the rolling bodies of at least two rows differ, and the rolling body diameters of the rolling bodies of the outer rows are particularly preferably greater than the rolling body diameters of the rolling bodies of the inner rows. By means of the rolling body diameters which decrease from the outside to the inside, it is likewise possible to obtain the advantages of tapered rolling bodies without it being necessary here to accept the disadvantages stated above. However, all roller bodies can have the same roller body diameter.

A carrier-side outer diameter of the bearing is advantageously greater by more than 6 mm than the sum of the carrier-side pitch circle diameter and the rolling body diameter of the carrier-side rolling bodies. The carrier-side row is also referred to below as the row arranged at the vehicle inside. In order to obtain sufficient stability of the bearing and to simultaneously allow the bearing to be of as low a weight as possible, the above selection of the carrier-side outer diameter has proven, during detailed testing, to be a particularly suitable compromise.

In a further preferred embodiment, a flange-side outer diameter of the bearing is greater by more than 6 mm than the sum of the flange-side pitch circle diameter and the rolling body diameter of the flange-side rolling bodies. The flange-side row is also referred to below as the row arranged at the vehicle outside. The stated geometries particularly preferably apply both to the carrier-side outer diameter and also to the flange-side outer diameter of the bearing.

In a further preferred embodiment, the pitch circle diameter of an inner row is greater by more than 3.5 mm than the bore diameter of the rolling bearing. Here, the bore diameter preferably corresponds to the inner diameter of the bearing ring.

In a further preferred embodiment, the axial spacing between the first row and the second row, which is spaced apart from the first row, is smaller than the axial spacing between the second row and the third row, which is adjacent to the second row. The first and second rows and the third and fourth rows are preferably arranged in tandem formation with a central rim of the outer ring and/or inner ring situated between the second row and the third row.

At least one bearing ring, and preferably the inner ring, is formed from two inner ring halves. The design simplifies the assembly of the bearing. Here, the two inner ring halves are preferably braced against one another in the axial direction of the rolling bearing by means of a flanged collar. Each of the inner ring halves preferably has two raceways for the rolling bodies. It is however also possible for a single-piece inner bearing ring to be braced by means of a flanged collar. The outer ring is preferably formed in one piece.

Preferably, at least one raceway for the rolling bodies is provided on a flange body. In particular, the raceway is preferably a radially inner raceway. Here, the flange body is preferably braced against the inner ring or an inner ring half, so as to be rotationally fixed with respect to the latter. In this embodiment, the raceways of two rows, for example the raceways of the carrier-side rows, are situated in one inner ring half. In this embodiment, a second inner ring half is not provided, and instead, the raceways for the flange-side rows are arranged directly on or in the flange body on which the wheel flange is also arranged. In this way, the assembly expenditure for the bearing according to the invention can be reduced.

The rolling bodies are preferably selected from a group of rolling bodies which comprises balls, cylindrical rollers, cones and the like. It is preferable for rolling bodies of the same generic type to be situated in all the rows, though it is also possible to provide rolling bodies of different generic types in different rows.

In a further preferred embodiment, the pressure angles of at least two rows differ from one another. The pressure angle is to be understood to mean the angle under which pressure forces are transmitted from the outer ring via the rolling bodies to the inner ring or the inner ring halves. More precisely, the rolling bodies are braced along contact lines which run obliquely with respect to the longitudinal direction of the rolling bearing. The pressure angles are defined between the contact lines and the central plane. The pressure angles of the outer rows are preferably greater than the pressure angles of the inner rows. The pressure angles of the inner rows on the one hand and the pressure angles of the outer rows on the other hand are preferably of equal magnitude in each case. By means of the different pressure angles, it is possible to optimally adapt the load absorption of the bearing.

In a further preferred embodiment, the rolling bearing has a device for measuring the wheel rotational speed. The device may for example be a magnetic disk which outputs an alternating signal to a sensor as a result of rotation.

The present invention is also aimed at a wheel bearing having a rolling bearing of the above-described type.

BRIEF DESCRIPTION OF THE DRAWINGS

Further advantages and embodiments can be gathered from the appended drawings, in which:

FIG. 3 is the schematic illustration of FIG. 1 where all of the roller bodies have the same roller body diameter.

DETAILED DESCRIPTION OF THE INVENTION

Figure 1:
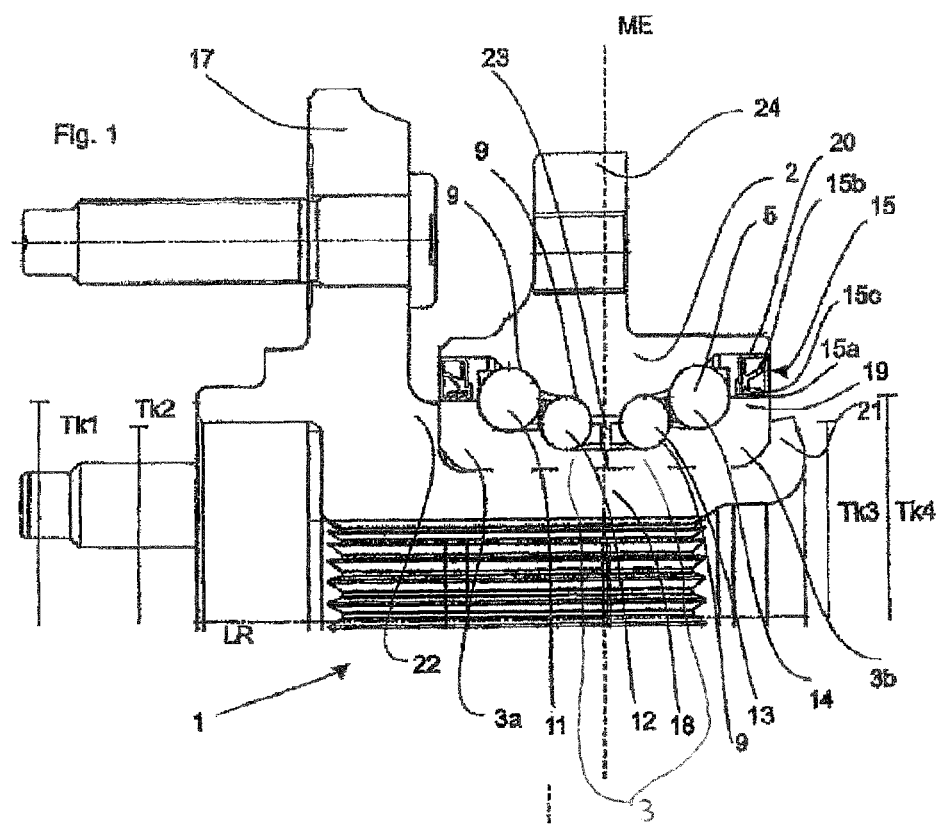
FIG. 1 is a schematic illustration of a rolling bearing according to the invention.
Figure 2:
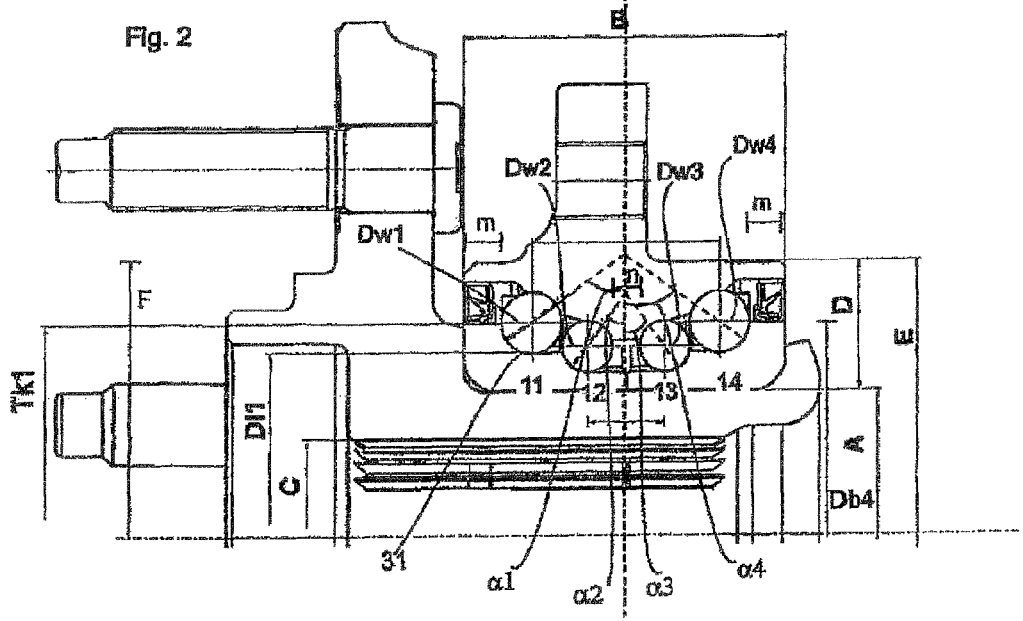
FIG. 2 is the illustration from FIG. 1, showing the geometries.

The rolling bearing shown in FIG. 1 has four rows 11, 12, 13 and 14 in which rolling bodies 5 are arranged in each case. Here, the rolling bodies 5 are arranged in each case in rings and run in a plane perpendicular to the plane of the Figure. The individual rolling bodies 5 can run in bearing cages (not shown in detail). For simplicity, in each case only one bearing half is illustrated in FIGS. 1 and 2.

As shown in FIG. 1, the individual rows 11, 12, 13 and 14 have different pitch circle diameters Tk1, Tk2, Tk3, Tk4 which, as mentioned in the introduction, are defined by the spacing from a rolling body center of one rolling body to an opposite rolling body, and again to the rolling body center of the latter.

In the embodiment shown in FIG. 1, the two rows 11 and 14 have greater pitch circle diameters Tk1, Tk4 than the rows 12 and 13. The pitch circle diameters of the rows 11 and 14 are equal, and the pitch circle diameters Tk2 and Tk3 of the rows 12 and 13 are also equal. The rolling bearing shown in FIG. 1 is therefore symmetrical about a central plane ME both with regard to the number of rows and also with regard to the respective pitch circle diameters.

The rolling bodies of the rows 11 and 14 also have a greater rolling body diameter than the rows 12 and 13. In this way, it is possible by means of the tandem arrangement of the rows 11 and 12 on the one hand and the tandem arrangement of the rows 13, 14 on the other hand to obtain that, in the bearing, it is possible to dispense with the tapered rollers known from the prior art, and it is also possible to utilize the advantages of tapered rollers.

Provided on an outer bearing ring 2 is a flange 24 which in turn serves for connecting to a carrier (not shown). Between the two rows 12 and 13, the outer ring 2 has a substantially radially inwardly pointing central rim 23. In the embodiment shown in FIG. 1, the flange 24 is arranged in the longitudinal direction not precisely in the center of the rolling bearing but rather so as to be offset in the direction of a flange 17.

In this embodiment, the flange 17 is formed in one piece with a flange body 18, on which are arranged inner ring halves 3a and 3b of a bearing inner ring 3. More precisely, the inner ring halves 3a, 3b are braced in the axial direction of the rolling bearing by means of a flanged collar 21 and a shoulder 22 which is arranged in the flange body 18.

In the embodiment shown in FIG. 1, in each case two raceways 9 for the rolling bodies are arranged on the two inner ring halves 3a and 3b. It would however also be possible to dispense with the inner ring halves 3a and to instead arrange the corresponding raceways 9 in the flange body 18. Conversely, the inner ring half 3b could also be dispensed with.

The reference numeral 19 relates to a radially outwardly pointing outer rim of the inner ring 3 or of the inner ring half 3b. The outer rim adjoins the raceway 9 of the row 14.

The reference numeral 15 relates to a seal for the rolling bearing. The seal is designed here as a cassette seal and has, on a reinforcement 20 which is arranged on the outer ring 2, three sealing lips 15a, 15b and 15c. One of the sealing lips 115a is prestressed at the periphery radially against the inner ring 3 or the inner ring half 3b thereof. A further sealing lip 15b bears axially against a sliding plate. The third sealing lip bears radially against the sliding plate.

Depending on the embodiment of the bearing, it would also be possible to dispense with one or both of the flanges 17, 24. For example, in a further embodiment (not shown), only one flange 24 is arranged on the outer ring 2, and the flange is provided on a vehicle-side carrier.

In a further embodiment, only one flange 17 is provided which can be connected to a wheel (not shown) and which is formed in one piece with the flange body 18.

FIG. 2 shows the illustration from FIG. 1, showing the geometries. In FIG. 2, the reference symbol B denotes the overall bearing width and the reference symbol D denotes the bearing height, that is to say the spacing between a radially inwardly pointing surface of the inner bearing ring 3 and a radially outwardly pointing surface of the outer bearing ring 2, neglecting the flange 24. The reference symbol F denotes the flange-side outer diameter of the outer ring and the reference symbol E denotes the outer diameter of the rolling bearing at the vehicle inside or carrier side.

The reference symbol A denotes the bore diameter of the rolling bearing. The reference symbols Dw denote the individual diameters of the respective rolling bodies; for example, the reference symbol Dw1 denotes the diameter of a rolling body 5 in the row 11. The reference symbols Tk1-Tk4 denote the individual pitch circle diameters of the respective rows. The reference symbols Db1-Db4 denote the respective rim diameters of the individual rows. For clarity, however, only the reference symbols Tk1 and Db4 are plotted.

The reference symbols Dl1-Dl4, with only the diameter Dl1 being shown, denote the respective raceway base diameters, and is measured from that section of a raceway 31 which lies radially at the inside. The reference symbol n denotes the width of the central rim between the rows 12 and 13.

The reference symbol m denotes the rim width of the inner ring or of the inner ring half 3b on that side which faces toward the vehicle inside. The reference symbols α1-α4 denote in each case the pressure angles.

The overall bearing width B is greater than the sum of all the rolling body diameters plus the rim widths m of the inner ring and the central rim width n. In addition, the overall bearing width is greater than 35 mm.

The in each case outer rows have greater pitch circle diameters. This means that the pitch circle diameter Tk1 of the row 11 is greater than the pitch circle diameter Tk2 of the row 12, and the pitch circle diameter Tk4 of the row 14 is greater than the pitch circle diameter Tk3 of the row 13.

In the embodiment shown in FIG. 2, the carrier-side outer diameter E of the outer ring is greater than the sum of the pitch circle diameter Tk4 and the diameter Dw4 of the rolling bodies in the row 14. The carrier-side outer diameter E is preferably at least 6 mm greater than the sum stated above.

The pitch circle diameter Tk3 is preferably at least 3.5 mm greater than the bore diameter A. The flange-side outer diameter F is preferably greater by more than 6 mm than the pitch circle diameter Tk1 of the row 11 plus the rolling body diameter Dw1.

Furthermore, in the embodiment shown in FIG. 2, the respective pressure angles α1 and α4 of the rows 11 and 14 are greater than the pressure angles α2, α3 of the rows 12 and 13. Here, the angles are specified in relation to the central plane ME. This means that the pressure angles of the outer rows, that is to say the angles under which the forces are transmitted from the outer ring to the inner ring, are greater in the outer rows than the pressure angle of the inner rows. It would however also be possible for the pressure angles of all the rows to be equal.

FIG. 3 is identical to FIG. 1 except the roller body diameters Dw1, Dw2, Dw3, and Dw4 are illustrated as being the same.

All the features disclosed in the application are claimed as being essential to the invention if novel, individually or in combination, over the prior art.

LIST OF REFERENCE SYMBOLS

1 Wheel bearing
2 Outer bearing ring
3 Inner bearing ring
3a, 3b Inner ring halves
5 Rolling body
9 Raceway
11, 12, 13, 14 Rows
15 Sealing device
15a, 15b, 15c Sealing lip
17 Flange
18 Flange body
20 Reinforcement
21 Flanged edge
22 Shoulder
23 Central rim of the outer ring
24 Flange
31 Radially inner section of a raceway
ME Central plane
A Bore diameter
B Overall bearing width
D Bearing height
E Vehicle-inner-side or carrier-side outer diameter
F Flange-side outer diameter
M Bearing center
n Central rim width
m Rim width of the inner ring
Db1-Db4 Rim diameter of the individual rows
Dl1-Dl4 Raceway base diameter
Dw1-Dw4 Diameter of the respective rolling bodies
Tk1-Tk4 Pitch circle diameter
α1, α2, α3, α4 Pressure angle

The invention claimed is:

1. A rolling bearing, comprising:
a first bearing ring;
a second bearing ring radially inside the first bearing ring; and
a plurality of rolling bodies arranged between the first bearing ring and the second bearing ring,
wherein the rolling bodies are arranged in at least four rows, at least two rows have a first pitch circle diameter, at least two further rows have a second pitch circle diameter which differs from the first pitch circle diameter, and the at least two rows, which have the first pitch circle diameter and the at least two further rows, which have the second pitch circle diameter are arranged symmetrically with respect to a plane which is perpendicular to a longitudinal direction of the bearing,
wherein the bearing has a flange-side outer diameter which is greater by more than 6 mm than a sum of a flange-side pitch circle diameter and a rolling body diameter of a flange-side rolling bodies,
wherein a pitch circle diameter of an inner row of the rolling bodies is greater by more than 3.5 mm than a bore diameter of the rolling bearing, and
wherein the at least two rows are outer rows, which have a first pressure angle and a fourth pressure angle and the at least two further rows are inner rows which a second pressure angle and a third pressure angle, the first pressure angle and the fourth pressure angle of the outer rows are greater than the second pressure angle and the third pressure angle of the inner rows.

2. The rolling bearing as claimed in claim 1, wherein the rolling bearing has an overall width of more than 35 mm.

3. The rolling bearing as claimed in claim 1, wherein the first pitch circle diameter of the at least two rows, which are outer rows, is greater than the second pitch circle diameter of the at least two further rows, which are inner rows.

4. The rolling bearing as claimed in claim 1, wherein the roller bodies of all of the at least four rows have the same rolling body diameter.

5. The rolling bearing as claimed in claim 1, wherein the at least two rows are outer rows and the at least two further rows are inner rows and the rolling, bodies have rolling body diameters with the rolling body diameters of the outer rows are greater than the rolling body diameters of the inner rows.

6. The rolling bearing as claimed in claim 1, wherein the bearing has a carrier-side outer diameters which is greater by more than 6 mm than a sum of a carrier-side pitch circle diameter and a rolling body diameter of the carrier-side rolling bodies.

7. The rolling bearing as claimed in claim 1, wherein an axial spacing between a first row and a second row which is adjacent to the first row is smaller than the axial spacing between the second row and a third row which is adjacent to said second row.

8. The rolling bearing as claimed in claim 1, wherein the second bearing ring has two bearing ring halves.

9. The rolling bearing as claimed in claim 1, further comprising at least one radially inner raceway for the rolling bodies is arranged on a flange body.

10. The rolling bearing as claimed in claim 1, wherein the rolling bodies are selected from a group of rolling bodies which comprises balls, cylindrical rollers, and cones.

11. The rolling bearing as claimed in claim 1, wherein pressure angles of at least two rows are different.

12. The rolling bearing as claimed in claim 1, wherein the rolling bearing has a device for measuring wheel rotational speed.

13. A wheel carrier having a rolling bearing as claimed in claim 1.

* * * * *